(12) United States Patent
Yamadaji

(10) Patent No.: US 6,192,138 B1
(45) Date of Patent: Feb. 20, 2001

(54) APPARATUS AND METHOD FOR EMBEDDING/UNEMBEDDING SUPPLEMENTAL INFORMATION

(75) Inventor: Shinji Yamadaji, Kanagawa-ken (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/073,985

(22) Filed: May 7, 1998

(30) Foreign Application Priority Data

May 8, 1997 (JP) .................................................. 9-118243
Jun. 9, 1997 (JP) .................................................. 9-150928

(51) Int. Cl.[7] .............................. G06K 9/00; G06K 9/36; G09C 3/00; H04N 7/167; B42D 15/00

(52) U.S. Cl. ........................... 382/100; 382/235; 380/54; 380/200; 283/113

(58) Field of Search .................................... 382/235, 200, 382/232, 212, 115, 306; 380/54, 24, 55, 200, 202; 283/113

(56) References Cited

U.S. PATENT DOCUMENTS

| | | | |
|---|---|---|---|
| 5,721,788 | * | 2/1998 | Powell et al. .......................... 382/100 |
| 5,734,752 | * | 3/1998 | Knox ..................................... 382/212 |
| 5,768,426 | * | 6/1998 | Rhoads ................................. 382/232 |
| 5,887,130 | * | 3/1999 | Doi et al. ............................. 395/186 |
| 5,915,027 | * | 6/1999 | Cox et al. .............................. 380/54 |
| 5,930,369 | * | 7/1999 | Cox et al. .............................. 380/54 |

FOREIGN PATENT DOCUMENTS

| | | | |
|---|---|---|---|
| 766 468 A2 | 4/1997 | (EP) | ................................ H04N/7/08 |
| 96/36163 | 11/1996 | (WO) | ............................... H04N/1/32 |

OTHER PUBLICATIONS

Nikkei Eletronics, Feb. 2, 1997 (No. 683), pp. 99–124, and 149–162.

(List continued on next page.)

*Primary Examiner*—Thomas D. Lee
*Assistant Examiner*—Wenpeng Chen
(74) *Attorney, Agent, or Firm*—Pillsbury Madison & Sutro LLP

(57) ABSTRACT

A supplemental information embedding apparatus having a device for capturing image data, a first memory for storing image data indicating the presence of copyright protection, a first encoder for encoding the image data obtained by the image capturing means to a first format digital image data by n stages of processing (n is a positive integer greater than or equal to 2), a second memory for storing the first format digital image data produced in the digital image data producing means, a second encoder for encoding the image data indicating the copyright data supplied from the image capturing device or the first memory to a second format digital watermark by i stages of processing (i is a positive integer less than n), a third memory for storing the second format digital watermark encoded by the second encoder, a decoder for decoding the first format digital image data stored in the second memory up to a desirable stage of decoding, a divider for dividing the second format digital watermark stored in the third memory into predetermined format blocks, an embedder for dispersively embedding the blocks of the digital watermark into the image data encoded up to i stage by the first encoder or the irate data decoded up to i stage by the decoder, a third encoder for encoding the image data obtained by the embedder by exerting operations on and after j stage (j=n−1) of encoding so as to produce the first format digital image data, and a fourth memory for storing the first format digital image data encoded by the third encoder.

24 Claims, 10 Drawing Sheets

OTHER PUBLICATIONS

Inspec Abstract No. B9805–6140C–250, C9805–5260B–147 & ITG–Fachberichte, No. 144, pp. 257–262, "Embedding of digital watermarks in video sequences encoded to standard MPEG–2", Hartung & Girod.

Inspec Abstract No. B9805–6140C–625 &Proc. Int Conf on Image Processing, Part vol. 1, pp. 520–523, "DCT–based watermark recovering without resorting to the uncorrupted original image", Piva et al.

* cited by examiner

```
BLOCK 1= (24,-9,  8,  0,  6,  4,-2,  0,  5,-1,  1,  0,  1,  0,  0,  0,  0,  1,  0,  0,  0, • • • •, 0, 0, 0, EOB)
BLOCK 2= (22,  0,10,  4,  0,-1,  0,  1,  0,  0,  0,  0,  0,  0,  0,  0,  0,  0,  0,  0,  0, • • • •, 0, 0, 0, EOB)
BLOCK 3= (20,  9,  4,  4,  0,  0,  1,  1,  1,  1,  1,-1,  2,  7,-3,  0,  1,  0,  1,  0,  0, • • • •, 0, 0, 0, EOB)
BLOCK 4= (20,  7,  9,  0,  0,-5,  4,  3,  2,  1,-1,  0,  0,  0,  0,  1,  1,  0,  0,  0,  0, • • • •, 0, 1, 0, EOB)
BLOCK 5= (22,15,  0,16,  8,  7,  5,  0,-5,  0,  0,  0,  0,  0,  0,  0,  0,  0,  0,  0,  0, • • • •, 0, 0, 0, EOB)
BLOCK 6= (18,15,-7,-6,  5,  6,-2,  1,  2,-1,  1,  1,  1,  1,  0,  0,  0,  0,  0,  0,  0, • • • •, 0, 0, 0, EOB)
BLOCK 7= (18,13,  4,  0,  3,  4,  2,  0,  3,-1,  1,  0,  1,  0,  0,  0,  1,  0,  0,  0,  0, • • • •, 0, 0, 0, EOB)
BLOCK 8= (19,  9,-8,-6,  6,-4,  2,  0,  4,  0,  0,  2,-2,  1,  0,  0,  0,-1,  0,  0,  0, • • • •, 0, 0, 0, EOB)
BLOCK 9= (15,10,  9,  7,  0,  5,-4,  6,-2,  1,  1,  3,  0,  0,  0,  1,  1,  0,  0,  0,  0, • • • •, 0, 0, 0, EOB)
```

FIG. 10

```
BLOCK 1= (24,-9,  8,  0,  6,  4,-2,  0,  5,-1,  1,  0,  1,  0,  0,  0,  0,  1, 0, 0, 0, • • • •, 0, 0, 0, EOB)
BLOCK 2= (22,  0,10,  4,  8,-1,  0,  1, 0, 0, 0,  0,  0,  0,  0,  0,  0,  0, 0, 0, 0, • • • •, 0, 0, 0, EOB)
BLOCK 3= (20,  9,  4,  4,  0,  0,  1,  1, 1, 1, 1,-1,  2,  7,-3,  0,  1,  0, 1, 0, 0, • • • •, 0, 0, 0, EOB)
BLOCK 4= (20,  7,  9,  0,  0,-5,  4,  3,  2,  1,-1,  0,  0,  0,  0,  1,  1,  0,-1, 0, 0, • • • •, 0, 1, 0, EOB)
BLOCK 5= (22,15,  0,16,  8,  7,  5,  0,-5, 0, 0, 0,  0,  0,  0,  0,  0,  0,  0,  0,  0, • • • •, 0, 0, 0, EOB)
BLOCK 6= (18,15,-7,-6,  5,  6,-2,  1,  2,-1, 1, 1,  1,  1, 0, 0, 0,  0,  0,  0,  0, • • • •, 0, 0, 0, EOB)
BLOCK 7= (18,13,  4,  0,  3,  4,  2,  0,  3,-1,  1,  0, 1, 0, 0,  0,  1,  0,  0,  0,  0, • • • •, 0, 0, 0, EOB)
BLOCK 8= (19,  9,-8,-6,  6,-4,  2,  0,  4,  0,  0,  2,-2, 1, 0, 0,  0,-1, 0, 0, 0, • • • •, 0, 0, 0, EOB)
BLOCK 9= (15,10,  9,  7,  0,  5,-4,  6,-2,  1,  1,  3,  0,  0,  0,  1,  1, 0, 0, 0, 0, • • • •, 0, 0, 0, EOB)
```

FIG. 11

```
BLOCK 1= (24,-9,  8,  0,  6,  4,-2,  0,  5,-1,  1,  0,  1,  0,  0,  0,  0,  1, 8, 1, 0, • • • •, 0, 0, 0, EOB)
BLOCK 2= (22,  0,10,  4,  0,-1,  0,  1, 8, 1, 0,  0,  0,  0,  0,  0,  0, 0, 0, 0, 0, • • • •, 0, 0, 0, EOB)
BLOCK 3= (20,  9,  4,  4,  0,  0,  1,  1, 1, 1, 1,-1,  2,  7,-3,  0,  1,  0, 1, 5, 1, • • • •, 0, 0, 0, EOB)
BLOCK 4= (20,  7,  9,  0,  0,-5,  4,  3,  2,  1,-1,  0,  0,  0,  0,  1,  1,  0,-1, 0, • • • •, 0, 1, 0, EOB)
BLOCK 5= (22,15,  0,16,  8,  7,  5,  0,-5, 2, 1, 0,  0,  0,  0,  0,  0,  0,  0,  0,  0, • • • •, 0, 0, 0, EOB)
BLOCK 6= (18,15,-7,-6,  5,  6,-2,  1,  2,-1, 1, 1,  1,  1, 9, 1, 0,  0,  0,  0,  0, • • • •, 0, 0, 0, EOB)
BLOCK 7= (18,13,  4,  0,  3,  4,  2,  0,  3,-1,  1,  0, 3, 1, 0,  0,  1,  0,  0,  0,  0, • • • •, 0, 0, 0, EOB)
BLOCK 8= (19,  9,-8,-6,  6,-4,  2,  0,  4,  0,  0,  2,-2, 1, 0, 0,  0,-1, 6, 1, 0, • • • •, 0, 0, 0, EOB)
```

FIG. 12

APPARATUS AND METHOD FOR EMBEDDING/UNEMBEDDING SUPPLEMENTAL INFORMATION

FIELD OF THE INVENTION

The present invention relates to image data processing techniques, such as JPEG systems, MPEG systems, etc., and more particularly to an apparatus and a method for embedding/unbedding supplemental information and a record medium therefor, which are applied with an electronic watermark technology for embedding the copyright data or personal identification data into the digital image data.

BACKGROUND OF THE INVENTION

Recently, DCT (Discrete Cosine Transform)-based image compression/expansion technologies such as JPEG (Joint Photographic Coding Experts Group) systems and MPEG (Moving Picture Experts Group) systems have come into practice as fundamental technologies for realizing multimedia.

An electronic still camera has become widespread in use, which converts an imaging object into an electric signal by an optoelectric transducer device such as a CCD (charge coupled device), performs the specific digital signal processing, then records the digitized still rage into a recording medium such as a memory card. The image data are digitized for compressing the huge amount of its code, using the high efficiency encoding such as the JPEG (Joint Photographic Coding Experts Group).

Further, with the establishment of the high efficiency encoding technologies for such a still image, the digital processing of a moving image has been developed. The high efficiency encoding technology used in the moving picture is to encode the image data at the lower bit rate so as to improve the efficiency of the digital transmission or recording, and an MPEG-1 (ISO/IEC 11172) of the high efficiency encoding standard is already used in various media, such as a video CD (Compact Disc), a CD-I (Compact Disc-Interactive), etc. Further, an MPEG-2 (Moving Picture Experts Group 2) standard which is a standard corresponding to the image quality of the conventional broadcasting has also been put to practical use, and picture software items based on the MPEG-2 standard have been on sale.

An embodiment of the conventional JPEG system image compressing apparatus is shown in FIG. 1.

An image that is input to an image compressor is divided into 8×8 pixel blocks, and then rearranged to frequency components by the DCT processing carried out in a DCT processor 51. The blocks rearranged to frequency components (DCT coefficients) are transformed into one dimensional format from two dimensional format by the zigzag scanning or the alternate scanning carried out in a scanner 52. A quantizer 53 divides each DCT coefficient of the blocks converted into one dimensional format by a quantization matrix table coefficient, and then obtains quantized data from the result of this division by rounding it to a nearest whole figure. A VLC processor 54 carries out the reversible compression (variable length encoding) of the quantized DCT coefficients. Compressed data of the blocks are thus obtained. By executing the above operations for all blocks of input images successively, compressed image data for one frame are obtained.

Further, in the case of the MPEG to compress moving pictures, the DCT processed blocks are quantized and the quantized blocks are transformed into one dimensional format from two dimensional format. That is, the scanning procedures of the MPEG system is reverse to those of the JPEG system.

Now, the configuration of the JPEG system image decoder is partially shown in FIG. 2.

A VLD processor 61 carries out the variable length decoding of input image compression data by looking up the Huffman table. The variable length decoded data (quantized DCT coefficients) are reverse quantized by multiplying by coefficients of the quantization matrix table in a reverse quantizer 62. The quantized DCT coefficients are reverse scan transformed from one dimensional format to two dimensional format blocks in a reverse scanner 63, and then inverse DCT processed in an IDCT processor 64, and 8×8 pixel blocks which are close to an original image are thus reproduced.

Further, in the case of the MPEG, the variable length decoded data are reverse quantized after being reverse scan transformed. Demands for and the necessity of embedding such supplemental information 72 as character information for explaining contents of an image 71 in an electronic album, as shown in FIG. 3, ID information for individual identification for the purpose of preventing illegal copying of digital images are increasing in recent years.

For adding character information, there are several methods available, including a method of storing image data and character information in separate files, and a method of producing one file by pasting image data and character information on separate application softwares.

However, the method of storing image data and character information in separate files results in an increase of the number of files. In addition, the method of adding image data and character information on separate application software results in an increase in the file size and necessitates an exclusive reading device and a software when a file name changes.

Further, recently, the need for protecting the copyrights of these digital still pictures or digital moving pictures has increased. One of the techniques for resolving these issues is digital watermark technology.

The digital watermark technology embeds the digital watermark such as a sentence or a logo mark which could be used to protect the copyright or a trademark, into the image data of the digital still picture such as a JPEG compression image or the digital moving picture such as an MPEG compression image. The copyright data are embedded in the JPEG image data or MPEG image data in the way that the embedded data are not displayed in accordance with the JPEG or the MPEG standard, even if the JPEG image data or the MPEG image data are decoded.

If a JPEG or an MPEG image data accompanied by a digital watermark representing a copyright has been illegally copied, a copyright owner can confirm his copyright by unbedding the digital watermark from the copy of image data in accordance with a prescribed procedure.

Now, a conventional system for embedding the digital watermark into the JPEG image will be described. Conventionally, the digital watermark is embedded into the JPEG image after a JPEG compression has been made.

That is, the image data captured by the image capturing device such as a CCD are divided into 8×8 pixel blocks and are input to the frequency converter for carrying out a DCT (Discrete Cosine Transform) which is for a quadrature transform encoding. In the DCT, which operates as a frequency converter, the 8×8 pixel blocks are arranged in different order of the frequency ingredients. The rearranged blocks (DCT coefficient) are rounded off to the nearest integer by the quantizer, after the coefficient corresponding to a matrix is divided by the quantization matrix table. Accordingly a first stage of compression processing (non-reversible compression) is carried out.

The quantized matrix data are converted into one dimensional format from two dimensional format by a scanner. The data converted into one dimensional format are processed through variable length encoding by looking up the encoding table, such as a Huffman table for instance, and further processed through the second compression processing (reversible compression) by a VLC (Variable Length enCoder) processor, so that the compressed data of the 8×8 pixel blocks are obtained.

After performing the operations mentioned above to all blocks of input image, the ultimate compressed data are obtained and stored in the external memory such as a memory card.

Then, a digital watermark presenting a copyright, a logo mark, or a trademark is embedded into the JPEG compression image data by using a special purpose machine, such as a computer equipped with software for embedding digital watermarks, before the image data are stored in the external memory.

In the conventional system described above, there was a need to embed the digital watermark, such as the copyright data, to the JPEG image data by using a special purpose software and computer for embedding the digital watermark after the JPEG image data are obtained by the JPEG image producing device such as an electronic still camera. As a result, the system became large.

Further, though the digital image data can be easily produced with the wide spread of the electronic still camera and the portable digital video equipment, there are no systems capable of embedding the copyright data in a real-time manner at the time of image capturing operation.

On the other hand, adding ID information for identifying individuals to image data can be performed through different methods, including a method of adding images such as signs for identifying individuals in case of, e.g., image data in a bitmap format, into the LSB (Least Significant Bit) in 8 bits (256 tones) for expressing pixels, and a method of replacing DCT processed low frequency band image data, in case of a JPEG or an MPEG image compression data, with spread spectrum ID information.

However, when embedding ID information for identifying individuals into image data, the quality of the reproduced image is reduced by the image data being partially lost by the supplemental information.

As described above, though the digital image data are easily produced with the popularity of the electronic still camera or a portable digital video, the conventional system had a drawback in that it can not embed the copyright data in a real-time manner during image capturing, so that it had to embed the digital watermark, such as the copyright, by using a large scale system using software or a computer for embedding the digital watermark.

As described above, the conventional method of embedding supplemental information such as character information into image compression data also has a drawback of increasing in the number of files and the size of files. Furthermore, in a conventional method of embedding supplemental information such as ID information for identifying individuals, etc. into image compression data, the quality of reproduced image is reduced by a part of original image data being lost by the supplemental information.

SUMMARY OF THE INVENTION

It is, therefore, an object of the present invention to provide a supplemental information embedding apparatus and a supplemental information embedding method capable of embedding the digital watermark, which protects the copyright, to the captured digital image data at a real-time without using a large scale system, in the electronic still camera or the digital video recorder.

A second object of the present invention is to provide a supplemental information embedding/unbedding apparatus and its method capable of minimizing the reduction of reproduced image quality caused by embedding the supplemental information into the image compression data.

Another object of the present invention is to provide a supplemental information embedding/unbedding apparatus and its method capable of minimizing a reduction of data compression ratio resulting from the embedding of supplemental data into image compression data.

A further object of the present invention is to provide an image decoder and an image expansion method capable of completely eliminating the reduction of reproduced image quality caused by embedding the supplemental information into the image compression data.

In order to achieve the above objects, a supplemental information embedding apparatus according to one aspect of the present invention includes a device for capturing image data, a first memory for storing image data indicating the presence of copyright protection, a first encoder for encoding the image data obtained by the image capturing device to a first format digital image data by n stages of processing (n is a positive integer greater than or equal to 2), a second memory for storing the first format digital image data encoded by the first encoder, a second encoder for encoding the image data indicating the copyright data supplied from the image capturing device or the first memory to a second format digital watermark by i stages of processing (i is a positive integer less than n), a third memory for storing the second format digital watermark encoded by the second encoder, a decoder for decoding the first format digital image data stored in the second memory up to a desirable stage of decoding, a divider for dividing the second format digital watermark stored in the third memory into predetermined format blocks, an embedder for dispersively embedding the blocks of the digital watermark into the image data encoded up to i stage by the first encoder or the image data decoded up to i stage by the decoder, a third encoder for encoding the image data obtained by the embedder by exerting operations on and after j stage (j=n−1) of encoding so as to produce the first format digital image data, and a fourth memory for storing the first format digital image data encoded by the third encoder.

A supplemental information embedding apparatus according to second aspect of the present invention includes an orthogonal transformer for orthogonally transforming divided blocks of image data, a quantizer for quantizing the divided blocks of image data after the orthogonal transform, and an embedder for embedding supplemental information in place of at least a part of a zero-run section immediately preceding an EOB (End of Block) in each of the quantized blocks of image data.

A supplemental information embedding apparatus according to another aspect of the present invention includes an orthogonal transformer for orthogonally transforming divided blocks of image data, a quantizer for quantizing the divided blocks of image data after the orthogonal transform, and an embedder for embedding supplemental information in place of the head of a zero-run section immediately preceding an EOB (End of Block) in each of the quantized blocks of image data.

A supplemental information embedding apparatus according to still another aspect of the present invention includes an orthogonal transformer for orthogonally transforming divided blocks of image data, a quantizer for quantizing the divided blocks of image data after the orthogonally transform, a divider for dividing supplemental information corresponding to one frame of the image data into a plurality of blocks, and an embedder for dispersively embedding the divided blocks of supplemental information into the image data in place of the head of a zero-run section immediately preceding an EOB (End of Blocks) of the quantized blocks of image data.

An image decoder for decoding image compression data wherein supplemental information is embedded in place of at least a part of a zero-run section immediately preceding an EOB (End of Block), which is obtained by dividing image data, orthogonal transforming the divided blocks of image data and quantizing the orthogonal transformed blocks of image data, according to still another aspect of the present invention, includes an unbedder for unbedding the supplemental information from the image compression data, a memory for storing the unbedded supplemental information, a replacer for replacing the supplemental information embedded in the image compression data with a zero-run, a reverse quantizer for reverse quantizing the zero-replaced image compression data, and a reverse orthogonal transformer for reverse orthogonal transforming the reverse quantized image compression data.

An image decoder for decoding reversible compressed image data wherein supplemental information is embedded in place of at least a part of a zero-run section immediately preceding an EOB (End of Block) obtained by dividing image data, orthogonal transforming the divided blocks of image data and quantizing the orthogonal transformed blocks of image data, according to still another aspect of the present invention, includes a reversible decoder for reversible decoding the image compression data, an unbedder for unbedding the supplemental information from the reversible decoded image compression data, a memory for storing the unbedded supplemental information, a replacer for replacing the supplemental information embedded in the image compression data with a zero-run, a reverse quantizer for reverse quantizing the zero-replaced image compression data, and a reverse orthogonal transformer for reverse orthogonal transforming the reverse quantized image compression data.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 10 is a diagram showing examples of one dimensional blocks after quantization by the image compressor shown in FIG. 8;

FIG. 11 is a diagram showing the sections of one dimensional blocks after quantization into which supplemental information can be embedded, as shown in FIG. 10;

FIG. 12 is a diagram showing examples of quantized one dimensional blocks embedded with supplemental information;

DESCRIPTION OF THE PREFERRED EMBODIMENTS

The present invention will be described in detail with reference to the FIGS. 4 through 14.

Figure 4:
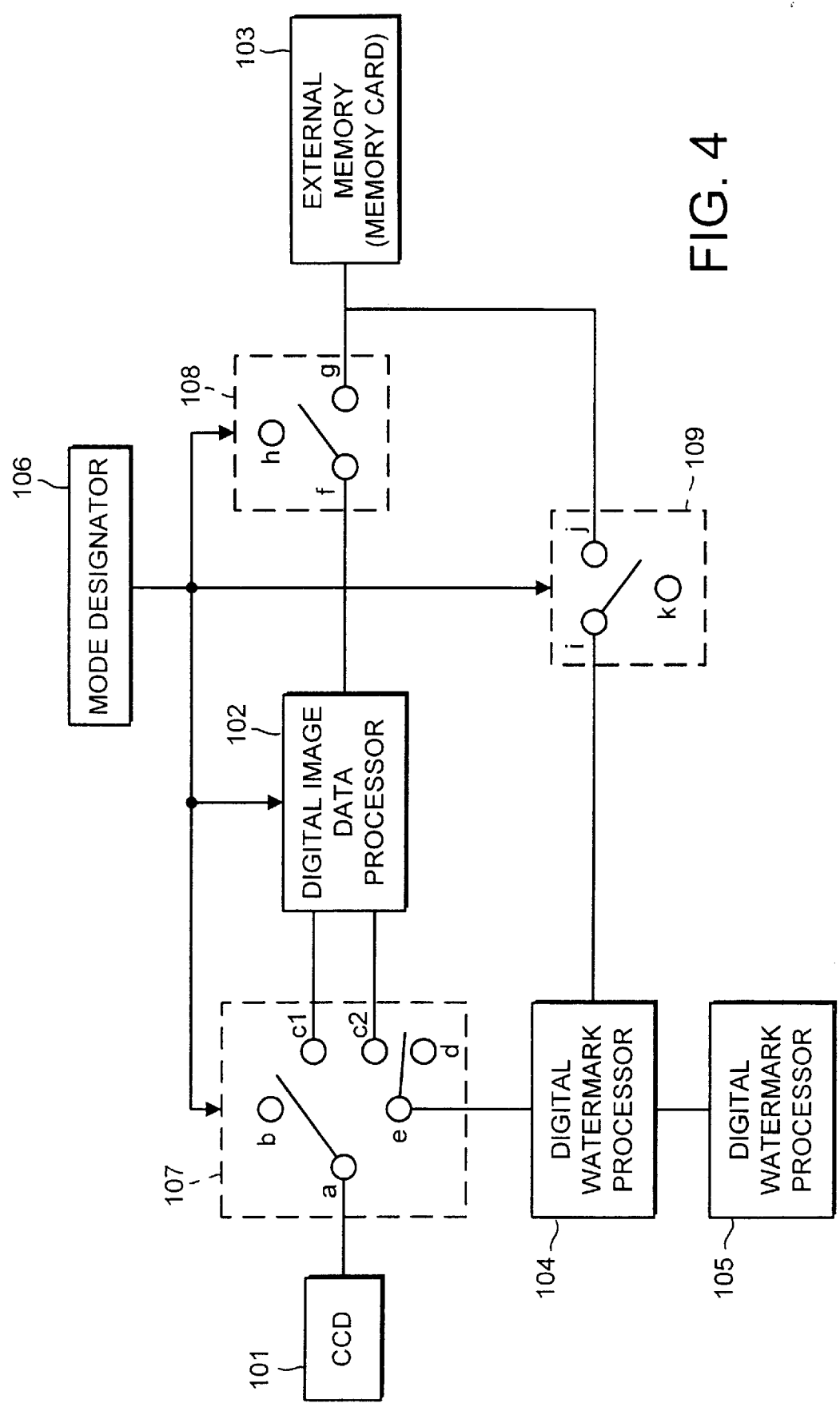
FIG. 4 is a block diagram showing the embodiment of the supplemental information embedding apparatus according to the present invention.
Figure 5:
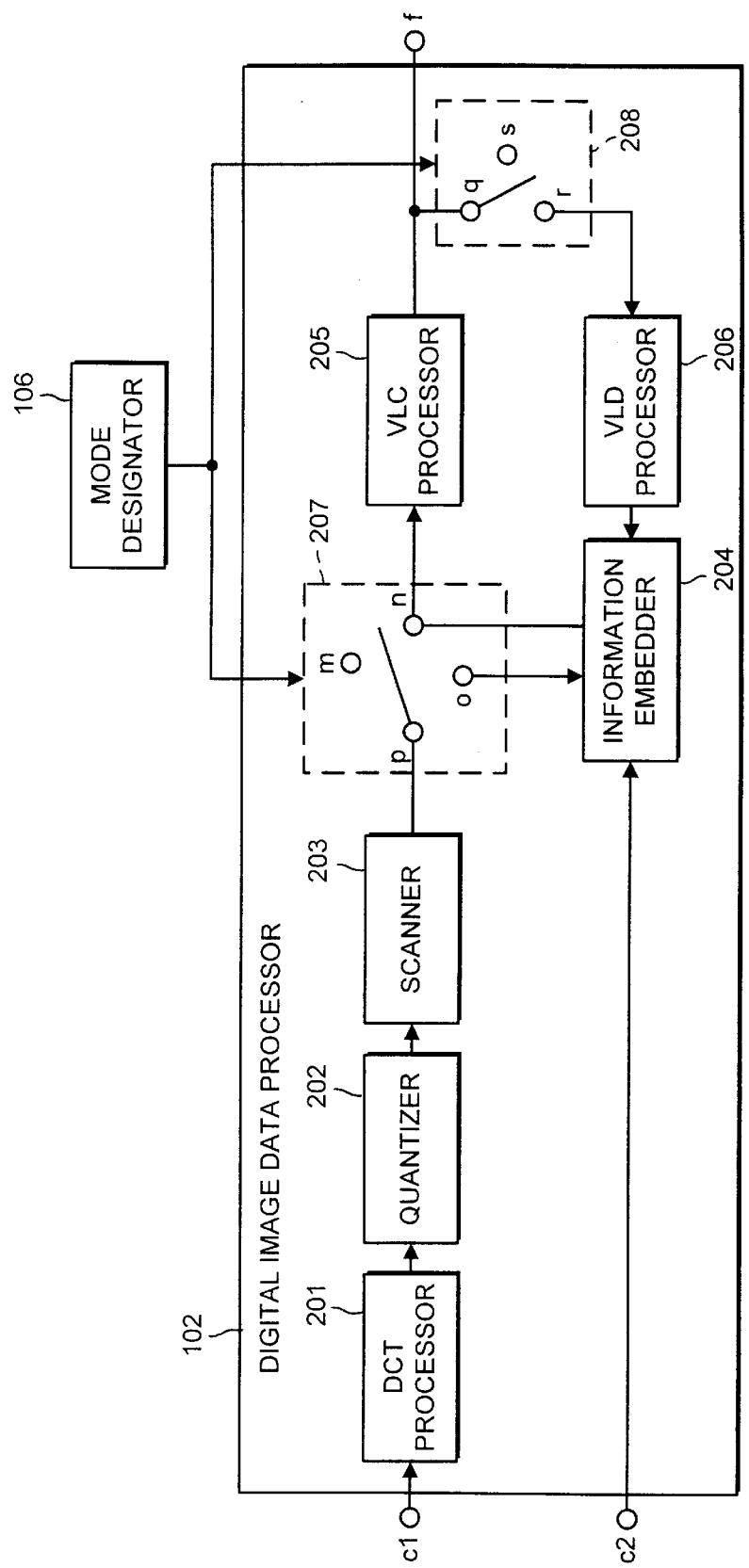
FIG. 5 is a block diagram showing an embodiment of the digital image data producer shown in FIG. 4.
Figure 6:
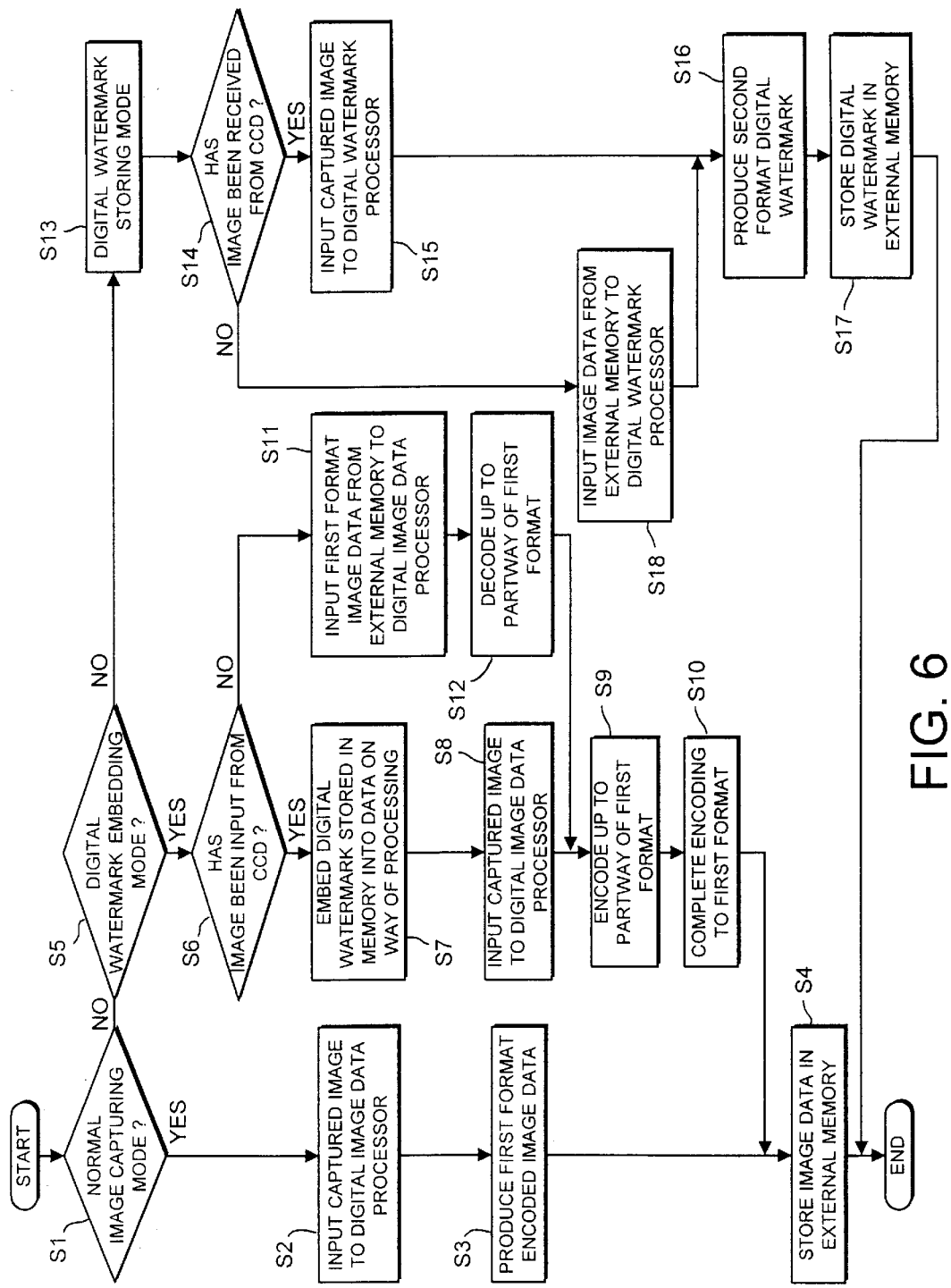
FIG. 6 is a flowchart showing the supplemental information embedding method of the present invention.

FIGS. 4 and 5 are block diagrams showing the embodiment of the supplemental information embedding apparatus according to the present invention. FIG. 6 is a flowchart showing the operation of the apparatus or a supplemental information embedding method.

In this embodiment, the digital image data will be explained by taking the JPEG which is the still image compression standard as an example.

In FIG. 4, a terminal a of a switch 107 is connected to a CCD 101 for capturing an image by optoelectrically transducing an image object light from an image object, a terminal c1 and a terminal c2 are connected to a digital image data processor 102 for encoding the digital image data and producing the compressed data such as the JPEG, and a terminal a is connected to a digital watermark processor 104 for carrying out conversion of the digital watermark such as the copyright data into a reduced-size picture, producing the compressed data such as the JPEG, and writing in and reading out of a digital watermark memory 105.

Further, the digital image data processor 102 is connected to a terminal f of a switch 108, a terminal g of the switch 108 is connected to an external memory 103 such as the memory card for storing the compressed data or a terminal f of a switch 109, and the digital watermark processor 104 is connected to a terminal i of the switch 109.

Then, the switches 107, 108, and 109 are respectively controlled by a mode designator 106.

On the other hand, FIG. 5 is a block diagram showing an embodiment of the digital image data producer, as shown in FIG. 4.

In FIG. 5, a terminal c1 is connected to a DCT processor 201 for carrying out the quadrature transform encoding by dividing the image data into 8×8 pixel blocks. The DCT processor 201 is connected to a quantizer 202. The quantizer 202 is then connected to a scanner 203 for scanning to convert the matrix data from the two dimensional format to the one dimensional format.

Further, a terminal c2 is connected to an information embedder 204, a terminal f is connected to a VLC processor 205 and a terminal q of a switch 208, and a terminal r of the switch 208 is connected to the information embedder 204 via a VLD (variable length decoder) processor 206.

Furthermore, a terminal p of a switch 207 is connected to the scanner 203, a terminal n is connected to the VLC processor 205 and the information embedder 204, and a terminal o is connected to the information embedder 204.

Then, the switches 207 and 208 are respectively controlled by the mode designator 106. Now, the operation of the supplemental information embedding apparatus according to the present invention constructed as mentioned above will be explained in reference to the flowchart shown in FIG. 6.

First, a normal image capturing operation (normal image capturing mode) of the present supplemental information embedding apparatus will be explained.

In the normal image capturing mode, the made designator 106 designates to connect the terminal a to the terminal c1, and the terminal a to the terminal d of the switch 107, the terminal f to the terminal g of the switch 108, and the terminal i to the terminal k of the switch 109.

Accordingly, the image data captured by the CCD 101 for capturing an image by op optoelectrically transducing the light from the image object are applied to the digital image data processor 102 (steps S1, S2), encoded, and converted into the JPEG compression data. The converting operation into the JPEG compression data will be explained in reference to FIG. 5. Here, in the normal image capturing mode, the terminal p is being connected to the terminal n in the switch 207, and the terminal q is being connected to the terminals in the switch 208.

In FIG. 5, the input image data input from the terminal c1 are divided into 8×8 pixel blocks for instance, and input to the DCT (frequency converter) 201 for carrying out DCT (Discrete Cosine Transform). In the DCT processor 201, i.e., the frequency converter, the 8×8 pixel blocks are arranged in different order of the frequency ingredient. The rearranged blocks (DCT coefficient) are rounded off to the nearest integer after the coefficient corresponding to the matrix is divided by the quantization matrix table in the quantizer 202 following the DCT processor 201. Accordingly, the first stage of the compression processing (non-reversible compression) is carried out (an amount of codes is reduced).

Since the information of the matrix data quantized in the quantizer 202 concentrates in the region of the low frequency components in the horizontal and vertical direction of the DCT conversion coefficient, the quantization output, i.e., the two dimensional format by the matrix scanning is converted into the one dimensional format by the zigzag scanning in the scanner 203. The one dimensional format data by the zigzag scanning are output to the VLC processor 205 via the terminal p and the terminal n of the switch 207.

In the VLC processor 205, the quantization output is processed into the Huffman encoding by, e.g., looking up the Huffman table. The Huffman encoding is for reducing the amount of codes by assigning a short code to the data having a high incidence and a long code to the data having a low incidence. Accordingly, the second compression processing (reversible compression) is carried out, so that the compressed data of the blocks are obtained.

By carrying out the operation mentioned above on all of the 8×8 pixel blocks of input image data, a fully compressed data is obtained (step S3). The obtained compressed data are output to the terminal f of the switch 108, as shown in FIG. 4, then output (recorded) to the external memory such as the memory card via the terminal g (step S4). Hereinafter, the format of the fully compressed data is referred to as a first format.

Now, a digital watermark storing mode for storing the digital watermark such as the copyright data to the digital watermark memory 105 will be explained. Here, the digital watermark storing mode is classified into a first digital watermark storing mode for storing the image data captured by the image capturing device as the digital watermark to the digital watermark memory 105, and a second digital watermark storing mode for storing the data stored in the external memory 103 such as a PC memory card or an IC memory card to the digital watermark memory 105 as the digital watermark.

First, the first digital watermark storing mode will be explained. In the first digital watermark storing mode, the mode designator 106 designates to connect the terminal a to the terminal a and the terminal a to the terminal d of the switch 107, connect the terminal f to the terminal h of the switch 108, and connect the terminal i to the terminal k of the switch 109.

The digital watermark is produced by capturing the character, logo mark or trademark which will be the copyright data written on the paper, or capturing a portrait of the copyright owner (steps S1, S5, 513, 514, and S15). Then, the image data captured as mentioned above, i.e., the image data captured by the image capturing device such as the CCD 101 is converted into the reduced-size picture in the digital watermark processor 104, and the reduced-size image data is carried out the JPEG compression (step S 16).

To record the image compression data to the watermark information memory 105 as the digital watermark, the digital watermark is recorded (step S17). Hereinafter, the format of the image compression data which is converted into the reduced-size image data and processed through the JPEG compression will be referred as a second format.

Now, the second digital watermark storing mode will be explained. In the second digital watermark storing mode, the mode designator 106 designates the terminal a to the terminal b and the terminal a to the terminal d in the switch 107, the terminal f to the terminal h in the switch 108, and the terminal i to the terminal j in the switch 109.

The digital watermark is obtained by selecting the copyright data stored in the external memory 103 (steps S1, S5, 513, 514, and S18). When the selected data are the image data, the image data read out from the external memory 103 are converted to the reduced-size picture, and the reduced-size picture is carried out the JPEG compression in the digital watermark processor 104, as same as the first digital watermark storing mode (step S 16). According to record image compression data in the digital watermark memory 105 as the digital watermark, the digital watermark is recorded (step S 17).

On the other hand, when the selected data are text data indicating the copyright and using the character line "(C) Copyright TOSHIBA" as the copyright data, the character line is converted to ASCII code and recorded in the watermark information memory 105 as the text data itself, so that the digital watermark is recorded.

By the way, in the explanation mentioned above, when the image data are used as the digital watermark, the captured color image data are changed simply to the reduced-size picture. However, if only the copyright is shown, a reduced-size picture may be produced by extracting only the luminance signal and then carrying out the JPEG compression. Accordingly, the data amount of the digital watermark will be compressed more because of the lack of the chrominance data, so as to eventually reduce the data amount of the supplemental information. That is, if the supplemental information amount is less, the reduction of image quality will be kept in minimum when the picture embedded with the digital watermark is decoded.

Now, the digital watermark embedding mode for embedding the digital watermark such as the copyright data into the image data will be explained. Here, the digital watermark embedding mode is classified into a first digital watermark embedding mode for embedding the digital watermark into the picture captured by the image capturing device, i.e., the CCD 101 in a realtime manner and a second digital watermark embedding mode for embedding the digital watermark into the JPEG compression image data stored in the memory such as the PC memory card.

First, the first digital watermark embedding mode will be explained. In the first digital watermark embedding mode, the mode designator 106 designates to connect the terminal a to the terminal c1 and the terminal a and the terminal c2 of the switch 107, the terminal f to the terminal g of the switch 108, and the terminal i to the terminal k of the switch 109.

As an example of digital watermark such as JPEG compression image data embedding/unbedding technique, there is a technique as disclosed in the Japanese Patent Application H8-318223. Hereinafter, an example of the digital watermark embedding/unbedding will be described by incorporating the digital watermark embedding device disclosed in the Japanese patent application H8-318223 in the supplemental information embedding apparatus according to the present invention.

The image data captured by the CCD 101 for capturing an image by op optoelectrically transducing the light from the image object are applied to the digital image data processor 102 via the terminals a and c1 of the switch 107 (steps S1, S5, S6 and S7). Referring now to FIG. 5, an operation of the digital image data processor 102 will be explained. Here, in this mode, the terminal p is connected to the terminal o in the switch 207, and the terminal q is connected to the terminal s in the switch 208, as shown in FIG. 5.

The image data input from the terminal c1 are processed through part of the encodings, i.e., the DCT processing, the quantization, and the scanning through the DCT processor 201, the quantizer 202, and the scanner 203 (the first compression) (step S8). Then, the one dimensional format output from the scanner 203 is supplied to the information embedder 204 via the terminals p and o of the switch 207.

The information embedder 204 receives the one dimensional format on the way of the JPEG compressing operation, and the digital watermark stored in the digital watermark memory 105, as shown in FIG. 4, through the terminals a and c2 of the switch 107.

As an example, scanned data corresponding to block 1 with 8×8 pixels are presented by;

block 1={24, −9, 8, 0, 6, 4, −2, 0, 5, −1, 1, 0, 1, 0, 0,. 0, 0, 1, 0, 0, 0, . . . 0, 0, 0, EOB} and data to be embedded has a format {8E529363} will be described.

At this time, it is possible to prevent the reduction of image quality during JPEG expansion by dispersively embedding supplemental information. Accordingly, if the supplemental information is embedded into the image data by one byte to one block of the image data, and the end code is set to {1}, data to be embedded into the one dimensional format will take a combination as follows. Since the data to be actually embedded will be 2 bytes (=supplemental information+ending code) for 2 pixels, the combination will be presented by;

{8,1}, {E,1}, {5,1}, {2,1}, {9,1}, {3,1}, {6,1}, t3,1}

An example of the one dimensional format embedded with the supplemental information {8, 1} in place of the block 1 in the image data will be described hereinafter. Here, the position where the data are embedded will be previously defined. As an image of normal pictures has a relatively small power in the horizontal and vertical high frequency regions, and the higher the horizontal and vertical frequency is, the larger the quantization coefficient is assigned, the horizontal and vertical high frequency regions of the quantization output, i.e., the one dimensional format data by the zigzag scanning has a high possibility of taking a succession of zeros, i.e., a zero-run. In this example, when the first part of the zero-run before the EOB will be taken, the block 1 is given as follows.

block 1={24, 1={24, −9, 8, 0, 6, 4, −2, 0, 5, −1, 1, 0, 1, 0, 0, 0, 0, 1, 6, 1, 0, . . . 0, 0, 0, EOB}.

Hereinafter, the supplemental data is divided into blocks, and then the blocks are dispersively embedded into the image data during three stages of processing, i.e., the DCT processing, the quantization processing, and the scanning processing have been completed on the way of the JPEG compression encoding to other blocks as the same way (step S9).

Then, the digital watermark is processed through the variable length encoding remaining in the JPEG compression process carried out in the VLC processor 205, until the JPEG compression data are completely embedded with the digital watermark (step S10). Here, the produced JPEG compression data are stored in the external memory 103 such as the memory card via the terminal f and the terminal g of the switch 108 (step S4).

In the JPEG, the data before the scanning processing are non-reversible compression, while the data after the scanning processing are the reversible compression. By embedding the supplemental information data to the data after the scanning processing, the supplemental information will be restored perfectly when the reversible compression processing is carried out.

Now, the second digital watermark embedding mode will be explained. In the second digital watermark embedding mode, the mode designator 106 designs to connect the terminal a to the terminal b and the terminal a to the terminal C2 in the switch 107, the terminal f to the terminal g in the switch 108, and the terminal i to the terminal k in the switch 109. Further, the terminal p is connected to the terminal m in the switch 207, and the terminal q is connected to the terminal r in the switch 208, as shown in FIG. 5.

The JPEG compression data to which any digital watermark stored in the external memory 103 such as the memory card is not yet embedded are processed through the variable length encoding in the VLD processor 206 via the terminal q and the terminal r of the switch 208 and supplied to the information embedder 204 (steps S1, S5, S6, 511, and S12).

Here, the variable length encoded data has similar block data as explained in the first digital watermark embedding mode.

On the other hand, the digital watermark is applied to the information embedder 204 through the terminals a and c2 of the switch 107.

Then, similar to the first digital watermark embedding mode, the digital watermark obtained by the digital watermark memory 105 is embedded into the data variable length decoded by the VLD processor 206, which is input into the information embedder 204 (step S9). The information embedded data are then variable length encoded in the VLC processor 205, so that a JPEG compression data embedded with the digital watermark is obtained (step S30). The produced JPEG compression data are stored in the external memory 103 such as the memory card via the terminal f and the terminal g of the switch 108 (step S4).

Even if the JPEG compression data to which the digital watermark obtained as mentioned above is embedded are carried out the JPEG expansion based on the JPEG standard and displayed on the monitor by the software for the image display, the embedded digital watermark are simply shown as a noise, so that the image quality is simply reduced a little.

Figure 7:
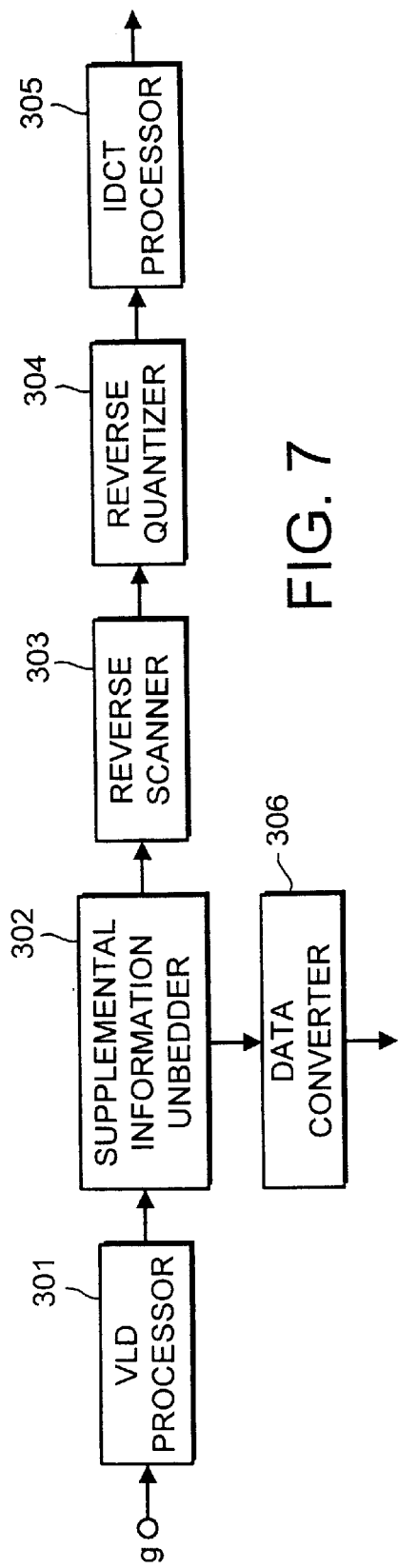
FIG. 7 is a block diagram showing an embodiment of the apparatus for unbedding the digital watermark.

To unbed the digital watermark embedded into the image data so as to display the copyright data, an unbedding apparatus and its method disclosed in the Japanese patent application H08-318223 can be available. FIG. 7 is a block diagram showing one embodiment of the unbedding apparatus.

In FIG. 7, the JPEG compression data are supplied to a terminal g from the external memory 103 such as the memory card (not shown). The JPEG compression data are supplied to a VLD processor 301 for carrying out the variable length decoding. The output of the VLD processor 301 is supplied to a supplemental information unbedder 302 for inversely carrying out the operation of the information embedder 204. The supplemental information, e.g., the digital watermark unbedded by the supplemental information unbedder 302, is converted to the copyright data (the picture, text, logo mark or trademark representing the copyright) in a data converter 306, then displayed to the supplemental information (copyright data) display (not shown).

On the other hand, the variable length decoded JPEG compression data after the supplemental information has beef removed therefrom are supplied to a reverse scanner 303 for carrying out the opposite processing to the scanner 203, a reverse quantizer 304 for carrying out processing opposite to that of the quantizer 202, and an IDCT processor 305 for carrying out the opposite processing to the DCT processor 201 in the order, and then supplied to an image data display for displaying the main image data thereon.

Figure 1:
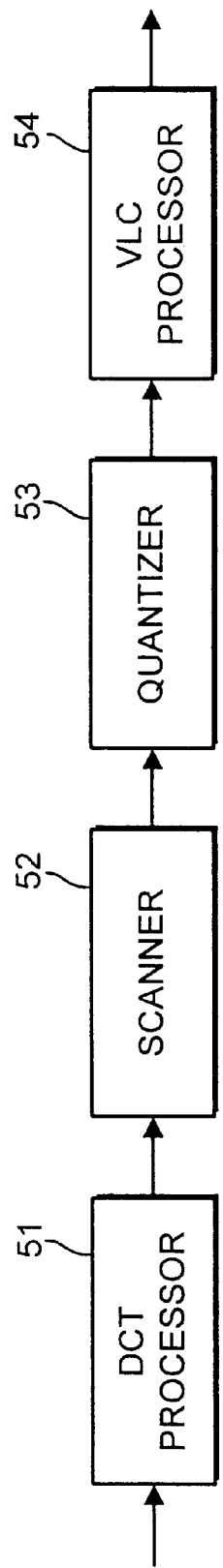
FIG. 1 is a block diagram showing the configuration of a conventional JPEG system image compressor.
Figure 2:
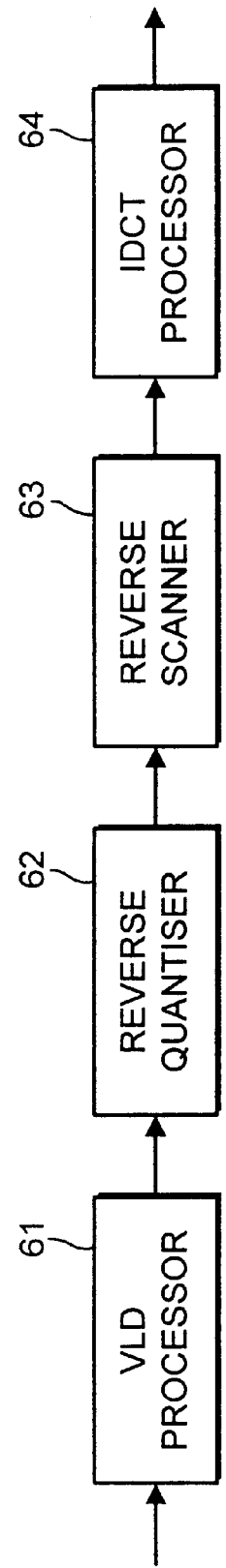
FIG. 2 is a block diagram showing the configuration of a conventional JPEG system image decoder.
Figure 3:
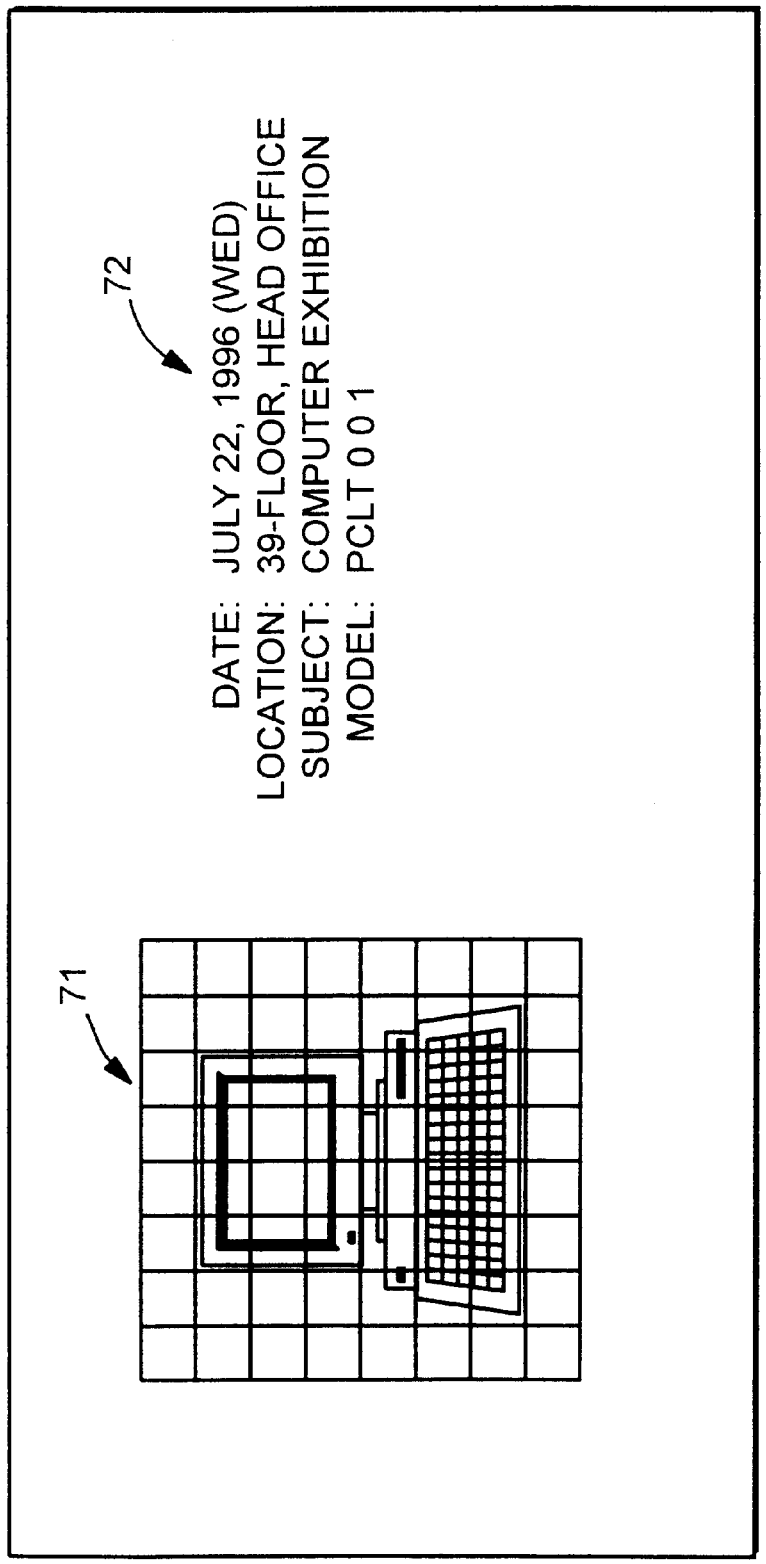
FIG. 3 is a diagram for explaining character information that is embedded into image data.

As described above, i.e., by carrying out a processing opposite to that carried out in the first digital watermark embedding mode, the digital watermark is unbedded. Here, the apparatus, as shown in FIG. 7, may be integrated with the apparatus as shown in FIG. 1.

As mentioned above, the first aspect of the present invention carries out the JPEG compression as the digital image processing in the digital image data processor 102. However, the data may be other digital still picture compression data or moving picture data operated by an MPEG standard, a standard for moving picture compression. Thus, the basic hardware thereof has a configuration similar to the configuration shown in FIG. 4. In this case, the internal arrangement of the digital image data processor 102 will correspond to the encoding algorithm.

Further, any data may be stored in the digital watermark memory 105 if the data can show the presence of copyright protection and can be converted to the digital data. That is, the data may be, for example, audio data. In case of audio data, the audio data are stored in the memory for audio via the external memory 103.

Furthermore, the embodiment of the present invention explains the case of using the PC memory card as the memory. However, the memory may be the disc medium or tape medium if it is ready to write and read the data thereto and therefrom. In this case, it is the matter of course to use a drive corresponding to each medium.

Hereinafter, second aspects of the present invention will be described.

Figure 8:
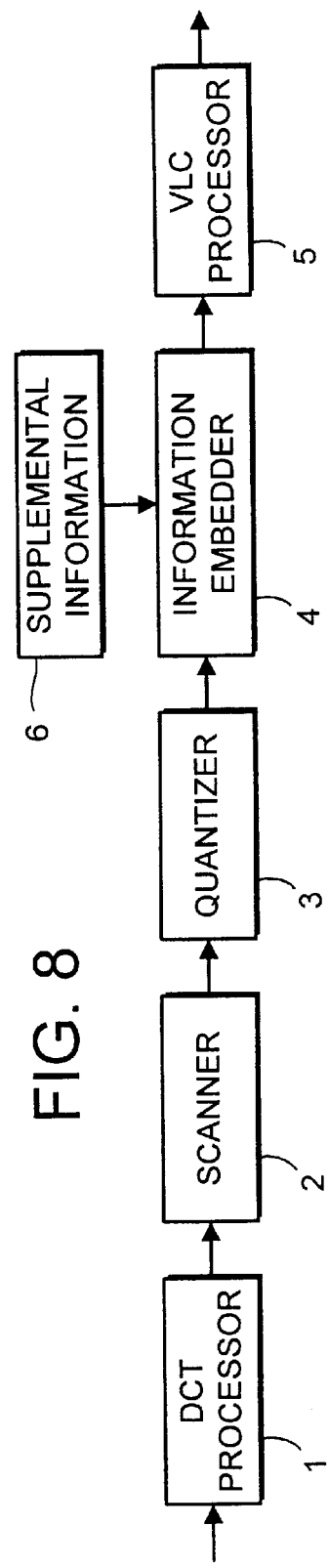
FIG. 8 is a block diagram showing the configuration of an image compressor of the present invention.

FIG. 8 is a block diagram showing the second aspect of the supplemental information embedding apparatus of the present invention.

As shown in FIG. 8, the supplemental information embedding apparatus is comprised of a DCT processor 1 for orthogonal transforming to decompose an original image data which was divided into 8×8 pixel blocks to frequency components by the DCT (Discrete Cosine Transform) processing, a scanner 2 for, e.g., zigzag scanning or alternate scanning the blocks (DCT coefficients) obtained by the DCT processing to convert them in a two dimensional format to a one dimensional format, a quantizer 3 for quantizing each of DCT coefficients of the blocks transformed to one dimensional format by using coefficients stored in a quantization matrix table, an information embedder 4 for embedding supplemental information 6 such as character information or ID information for identifying individuals, etc. into quantized block data according to predetermined requirements, and a VLC (Variable Length Coding) processor 5 for carrying out a reversible compression for block data embedded with the information by looking up a Huffman table.

Figure 9:
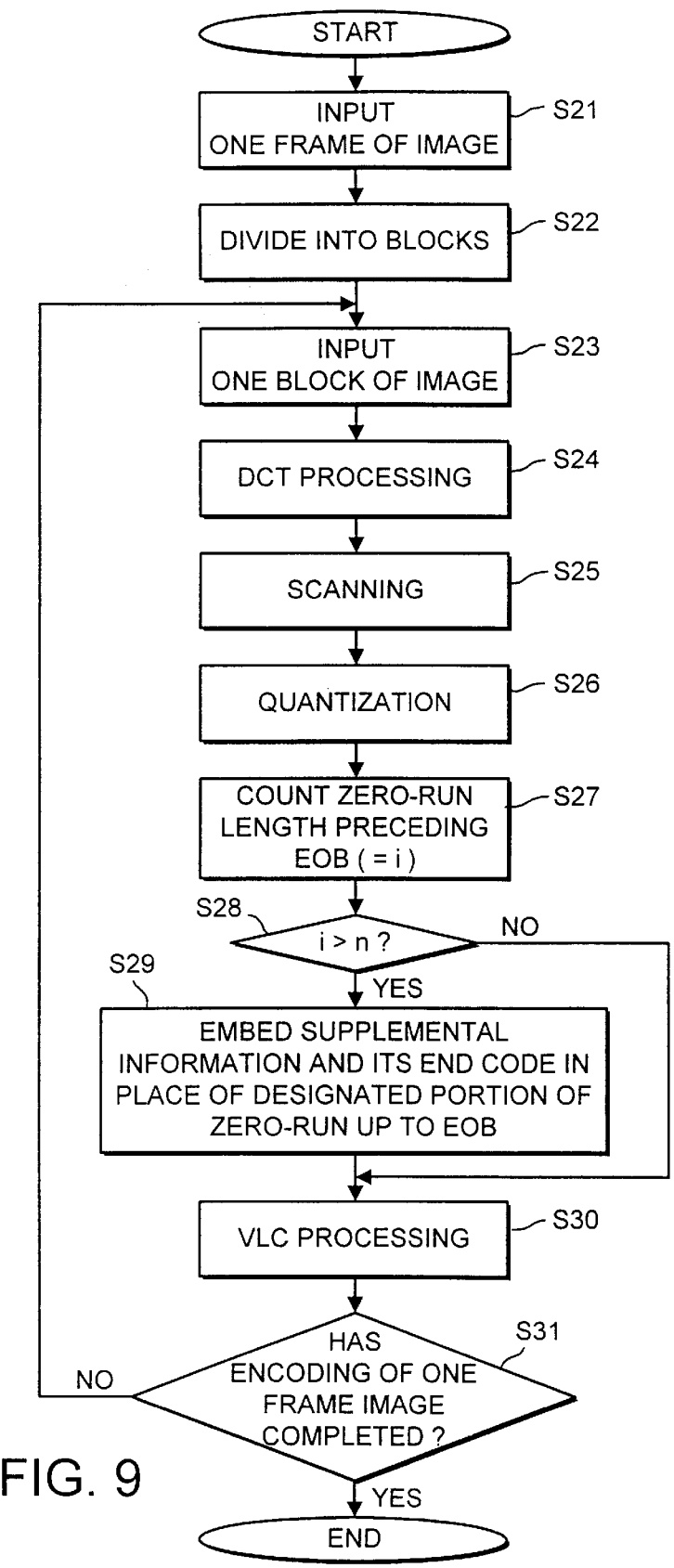
FIG. 9 is a flowchart showing the steps of image processing operation in the supplemental information embedding apparatus, as shown in FIG. 8.

Now, the operations carried out by the supplemental information embedding apparatus will be described. FIG. 9 is a flowchart showing the operations carried out by the supplemental information embedding apparatus.

Original images for one frame (640×480 pixels) that are input are divided into 8×8 pixel blocks (step S22), and then input to the DCT processor 1 (step S23). The DCT processor 1 carries out the DCT processing of input blocks (step S24). 8×8 pixel blocks data are rearranged to frequency components by this DCT processing. The block data that are rearranged to frequency components are input to the scanner 2 and converted into one dimensional format from two dimensional format (step S25). The block data processed the scanning are quantized in the quantizer 3 using the quantization matrix table (step S26).

FIG. 10 shows examples of the one dimensional format of each of the quantized blocks. Here, the EOB (End of Block) is a code indicating the end of block, while the section shown with three dots is a zero-run section. In the information embedder 4, supplemental information 6 is embedded into such quantized blocks according to the requirements shown below:

(1) (Supplemental Information+End Code) are embedded in place of the zero-run section immediately preceding the EOB. The end code is a code for indicating the end position of the supplemental information.

(2) End code should be {1}.

(3) (Supplemental Information+End Code) are embedded in the low frequency region (=the zero-run start portion) of the zero-run section immediately preceding the EOB by N pixels (for instance, N bytes by assuming 1 byte per pixel). Here, N is an optional set figure.

(4) If the count of zero-runs immediately preceding the EOB is not larger than a set figure M in the state of supplemental information being embedded, supplemental information will not be embedded.

According to the above requirements (1) and (2), supplemental information can be embedded without impairment of the original image compression data. That is, original image compression data (i.e., image compression data not embedded with supplemental information) can be restored by uniquely replacing a code section due to the supplemental information with a zero-run in data decoding operation. Further, according a to the requirement (3), it is possible to make a compression ratio as high as possible by the reversible compression (Huffman encoding). That is, if supplemental information is embedded in the middle portion or the end portion of the zero-run, the length of the zero-run section immediately preceding the EOB becomes short and the compression ratio drops. Further, according to the requirement (4), it becomes possible to discriminate a block with and a block without supplemental information embedded therein at the time of decoding data. If N and M are set at "2", the underlined section of each block becomes a section into which (Supplemental Information+End Code) can be embedded according to the requirements (1) and (3), as shown in FIG. 11. For instance, as the block 4 has only one zero-run section immediately preceding the EOB, supplemental information cannot be embedded according to the requirement (4). "i" in step S27 in the flowchart of FIG. 9 represents the count of the zero-run length immediately preceding the EOB, while "n" represents N+M (=2+2).

When embedding a Chinese letter name (i.e., supplemental information) such as "山風" into these blocks, the Chinese letter name "山風" is comprised "山"=8E52 and "風"=9363 in the shifted-JIS code, and therefore the supplemental information has a code sequence of {8E529363}.

According to the above requirements (2) and (3), data to be in place of each of the above blocks processed the scanning will have combinations as shown below.

Data to be embedded are 2 byte data for 2 pixels (=Supplemental Information+End Code) and becomes {8, 1}, {E, 1}, {5, 1}, {2, 1}, {9, 1}, {3, 1}, {6, 1}, {3, 1}. FIG. 12 shows the resulting data which is embedded with the 2 byte data (Supplemental information+End Code).

After obtaining image compression data embedded with the supplemental information 6 in the information embedder 4, the Huffman encoding (reversible compression) is executed for this image compression data in the VLC processor 5 (step S30).

As described above, because the supplemental information has been embedded between the non-reversible data compression by the orthogonal transforming operation and the reversible data compression by the Huffman encoding, supplemental information is no longer lost in the subsequent compression.

It is also possible to embed other supplemental information, for instance, ID information, codes, etc. for identifying individuals by executing the similar operation for all blocks in one frame, without impairment of original image compression data. If ID information or codes for identifying individuals are embedded into image compression data, as described above, it becomes possible to easily find any illegal copy of digital image data by restoring such supplemental information.

In case of the VGA (Video Graphics Array) screen (640× 480 pixels), as there are 4,800 blocks (=640×480/(8×8)), it is possible to includes 1,200 characters (=4,800/4) of the shifted JIS code at maximum in image compression data for one frame.

Further, in this embodiment supplemental information and the end code were embedded in place of the zero-run section immediately preceding the EOB. However, when image data are compressed using a succession of another figure, e.g., a succession of "1", supplemental information and the end code may be embedded in place of the run of the figure. Further, supplemental information and the end code were embedded in place of the first zero-run section, but a combination of start code, supplemental information and end code may be embedded in place of any mid portion of the zero-run.

Further, although the image data was divided into 8×8 pixel blocks, it 5 may be divided into other size of pixel blocks, e.g., 16×8 pixel blocks.

The compression data thus produced by embedding supplemental information into the original image data are recorded on a recording medium such as a ROM, an IC memory, a magnetic disc, a floppy disc, a CD, a DVD, etc.

Now, an image decoder for decoding image compression data obtained by the image compressor, as shown in FIG. 8, will be described.

Figure 13:
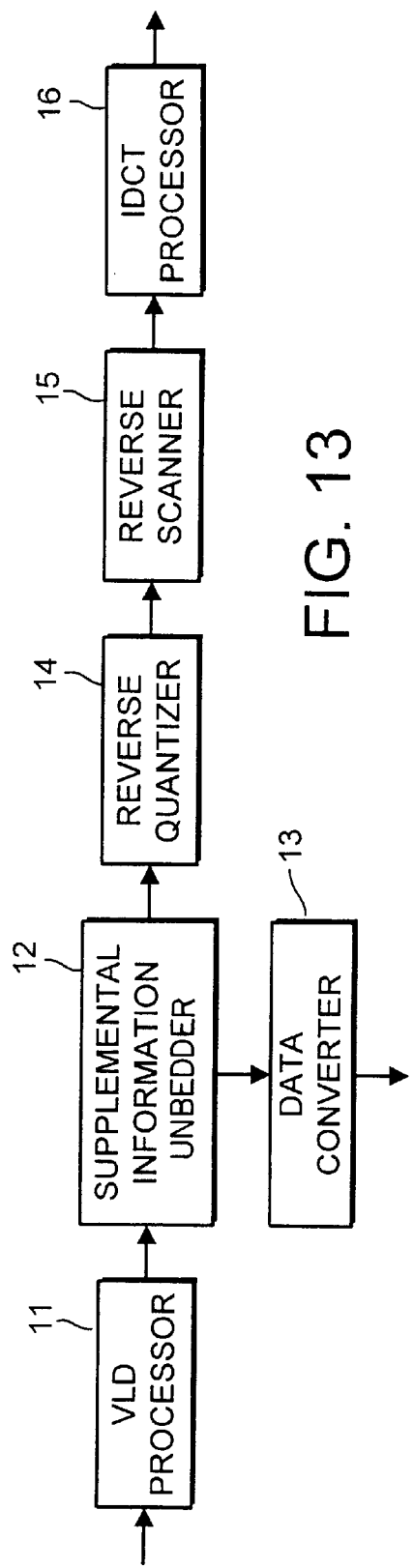
FIG. 13 is a block diagram showing the configuration of an image decoder of the present invention.

FIG. 13 is a block diagram showing a part of such an image decoder. As shown in FIG. 13, the image decoder is comprised of a VLD processor 11 for variable length decoding of image compression data by looking up a Huffman table, a supplemental information unbedder 12 for unbedding the supplemental information from data obtained through the VLD processing, a data converter 13 for converting the supplemental information unbedded by the supplemental information unbedder 12 into data to be displayed by accumulating them for every one frame unit, a reverse quantizer 14 for reverse quantizing data restored by replacing the data unbedded by the supplemental information unbedder 12, i.e., the combination of the supplemental information and the end code with original zero-run, a reverse scanner 15 for reverse scanning the reverse quantized data to reconvert them in one dimensional format to the two dimensional format and an IDCT processor 16 for inverse DCT processing the blocks processed the reverse scanning.

Figure 14:
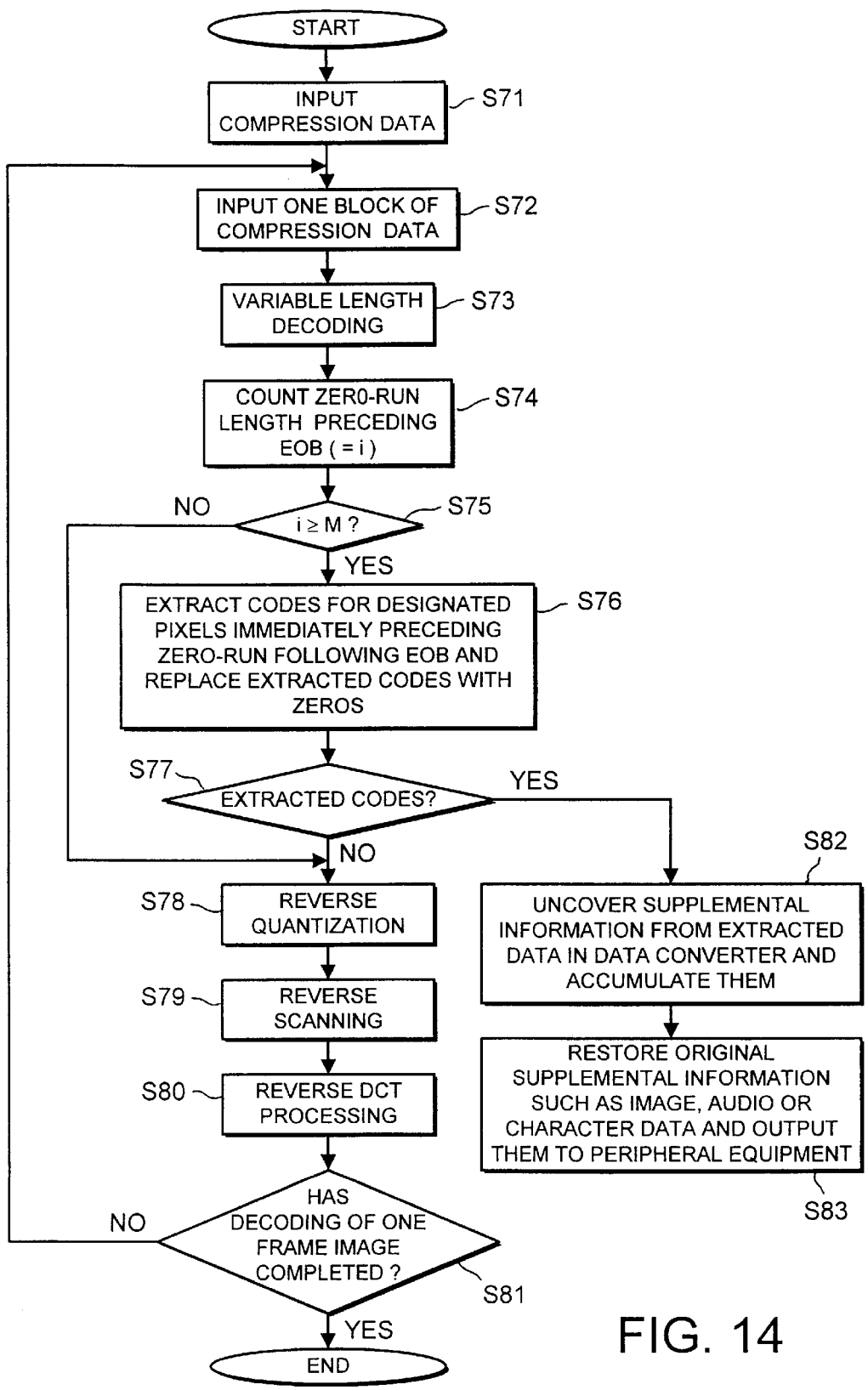
FIG. 14 is a flowchart showing the steps of supplemental information unbedding operation in the supplemental information unbedding apparatus, as shown in FIG. 13.

Now, an image decoding carried out by the image decoder will be described. Shown in FIG. 14 is a flowchart showing the steps of such an image decoding.

First, the variable length decoding is executed in the VLD processor 11 for one block of image compression data of input image compression data for one frame (step S73). As a result, block data immediately preceding the variable length encoding in the data compression, as shown in FIG. 12, are obtained. The supplemental information unbedder 12 unbeds supplemental information from the block data as follows according to the above-described requirements (1)–(4).

First, the length of a zero-run immediately preceding the EOB of variable length decoded block data is counted (step S74). Then, blocks embedded with and without supplemental information are discriminated according to the count and the requirement (4).

That is, if the length of the zero-run immediately preceding the EOB is not longer than a set figure M, it is found that no supplemental information is embedded according to the requirement (4). Then, the count of zero-runs is compared with the set figure M, and if $i \geq M$, it is possible to judge that supplemental information is embedded, while in other cases there is no supplemental information embedded (step S75). For instance, in case of Block 4 shown in FIG. 12, i equals to 1 and M equals to 2. And thus, it is seen that there is no supplemental information embedded therein. When supplemental information is embedded, as it is known that supplemental information+end code "1" for N (e.g., 2) pixels have been embedded according to the requirement (3), it is possible to extract data for 2 pixels in front of a zero-run immediately preceding the EOB as supplemental information and the end code from each block.

In other words, {8, 1}, {E, 1}, {5, 1}, {2, 1}, {9, 1}, {3, 1}, {6, 1}, {3, 1} are extracted from each block.

Further, as the section embedded with supplemental information at the time of compression was originally a zero-run, the original image compression data, as shown in FIG. 10, can be restored by replacing the section with a corresponding count of zeros (step S76).

When the image compression data is reverse quantized in the reverse quantizer 14 by looking up the Huffman table (step S77), and then converted into two dimensional format in the reverse scanner 15 (step S78) and further, are inverse DCT processed in the IDCT processor 16 (step S79), blocks that are close to its original image.

On the other hand, the supplemental information unbedder 12 separates information extracted from blocks into supplemental information and the end code according to the requirements (1) and (2), and after removing "1" that is the end code, the supplemental information only is sent to the data converter 13. The data converter 13 accumulates supplemental information for whole blocks of one frame (step S82), and restores original supplemental information such as image, audio or character data. The original supplemental information is then output to corresponding peripheral equipment (step S83).

That is, as it is known that supplemental information is {8, E, 5, 2, 9, 3, 6, 3} and character information, the Chinese letter name "崎" is obtained by the data conversion circuit 13.

Further, although the present invention applied to the JPEG to implement the quantization after the scanning at the time of image compression has been described in this embodiment, the present invention is also applicable similarly to such a compression system using frequency conversion and quantization as the MPEG, etc. which processes the scanning after quantization.

According to the first aspect of the invention, the digital watermark to be protected by the copyright can be easily embedded into the captured image or video data by a portable image capturing apparatus such as the electronic still camera or the digital video camera without using a large-scale system.

According to the second aspect of the invention, it becomes unnecessary to store supplemental information in a separate file and also it is able to decrease the reduction of reproduced image quality caused by embedding the supplemental information into the image compression data in a negligible order. That is, as supplemental information are embedded in place of the zero-run section of a block, that is, at the high frequency side, even when image compression data with supplemental information embedded therein are directly decoded by a conventional image decoder, noise by supplemental information is visually recognized and a reproduced image without any problem for practical use is obtained.

According to the other aspect of the invention, it becomes possible to minimize the drop of data compression ratio resulting from the reversible compression by the Huffman encoding, etc.

According to the other aspect of invention, the image decoder is able to reproduce image, audio or character data by unbedding supplemental information from the image compression data processed by the supplemental information embedding apparatus according, to the present invention, and also able to completely restore original image compression data thus keeping the quality of the original image by replacing the supplemental information with a zero-run.

As supplemental information corresponding to images for one frame are embedded in place of the head of the zero-run section immediately preceding the EOB by dispersing them into plural blocks, it becomes possible to increase the volume of supplemental information for one frame while minimizing the drop of data compression ratio by the reversible compression by the Huffman encoding, etc.

As described above, the present invention can provide an extremely preferable apparatus and method for embedding/unbedding supplemental information and record medium therefor.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A supplemental information embedding apparatus, comprising:
    a device for capturing a first image data;
    a first memory for storing a second image data indicating the presence of copyright protection;
    a first encoder for encoding the first image data obtained by the image capturing device to a first format digital image data by n stages of processing (n is a positive integer greater than or equal to 2);
    a second memory for storing the first format digital image data produced in the first encoder;
    a second encoder for encoding the image data indicating a copyright data supplied from the image capturing device or the first memory to a second format digital watermark by i stages of processing (i is a positive integer less than n);
    a third memory for storing the second format digital watermark encoded by the second encoder;
    a decoder for decoding the first format digital image data stored in the second memory up to a prescribed stage of decoding;
    a divider for dividing the second format digital watermark stored in the third memory into predetermined format blocks;

an embedder for dispersively embedding the blocks of the digital watermark into the image data encoded up to i stage by the decoder;

a third encoder for encoding the image data obtained by the embedder by exerting operations on or after j stage (=n−1) of encoding so as to produce the first format digital image data; and a fourth memory for storing the first format digital image data encoded by the third encoder.

2. A supplemental information embedding method, comprising:

receiving an image data from an image capturing device;

carrying out a first encoding operation for producing digital image data in a first format by n stages of processing (n is a positive integer greater than or equal to 2) for the image data captured by the image capturing device;

carrying out a second encoding operation for producing digital watermark in a second format by i stages of processing (i is a positive integer less than n) for a second image data indicating a presence of copyright Protection supplied from the image capturing device or a first memory storing a digital image data indicating the presence of copyright protection;

decoding the first format digital image data stored in a second memory up to a prescribed stage;

dividing the second format digital watermark stored in a digital watermark memory into predetermined format blocks;

dispersively embedding the blocks of the digital watermark into the image data encoded up to i stage by the first encoding operation or the image data decoded up to i stage by the decoding operation;

carrying out a third encoding operation on or after j stages of processing (j=n−i) to the image data obtained in the embedding of the digital watermark so as to reproduce the second format digital image data; and storing the first format digital image data encoded in the third stage encoding operation in a memory.

3. An image processing method as claimed in the claim 2, further comprising:

receiving another image data from the image capturing device;

encoding the other image data to the second format data so as to produce the digital watermark indicating the presence of copyright protection; and storing the digital watermark into the digital watermark memory.

4. An image processing method as claimed in claim 2, further comprising:

reading out the digital image data indicating the presence of copyright protection from the first memory;

encoding the digital image data to the second format so as to produce the digital watermark indicating the presence of copyright protection; and storing the digital watermark into the digital watermark memory.

5. An image processing method as claimed in claim 2, further comprising:

receiving another image data from the image capturing device;

carrying out encoding operations up to i stage (i is a positive integer less than n), to the other image data captured by the image capturing device;

dividing the second format digital watermark stored in the digital watermark memory into a specific format data;

dispersively embedding the blocks of the digital watermark into the image data encoded up to i stage;

carrying out the encoding operations on or after j stage (j=n−1) to the data embedded with digital watermark so as to reproduce the first format digital image; and storing the first format image data into a third memory.

6. An image processing method as claimed in claim 2, further comprising:

reading out the first format encoded image data stored in the second memory;

carrying out decoding operations up to i stage for the image data read out from the second memory;

dividing the second format digital watermark stored in the digital watermark memory into blocks;

dispersively embedding the blocks of the digital watermark so as to produce a specific format image data;

carrying out encoding operations on or after j stage (j=n−1) to specific format image data embedded with digital watermark so as to reproduce the first format digital image data; and storing the first format digital image data into the third memory.

7. A supplemental information embedding apparatus, comprising:

an orthogonal transformer for orthogonal transforming divided blocks of image data;

a quantizer for quantizing the divided blocks of image data after the orthogonal transform; and an embedder for embedding supplemental information in place of at least a part of a zero-run section immediately preceding an EOB (End of Block) in each of the quantized blocks of image data.

8. A supplemental information embedding apparatus, comprising:

an orthogonal transformer for orthogonal transforming divided blocks of image data;

a quantizer for quantizing the divided blocks of image data after the orthogonal transform; and an embedder for embedding supplemental information in place of the head of a zero-run section immediately preceding an EOB (End of Block) in each of the quantized blocks of image data.

9. A supplemental information embedding apparatus, comprising:

an orthogonal transformer for orthogonal transforming divided blocks of image data;

a quantizer for quantizing the divided blocks of image data after the orthogonal transform; and a divider for dividing supplemental information corresponding to one frame of the image data into a plurality of blocks; and an embedder for dispersively embedding the divided blocks of supplemental information into the image data in place of the head of a zero run section immediately preceding an EOB (End of Blocks) of the quantized blocks of image data.

10. A supplemental information embedding apparatus as claimed in any one of claims 7 to 9, further comprising:

a reversible compressor for reversible compressing the blocks of image data embedded with the supplemental information.

11. An image decoder for decoding image compression data wherein supplemental information is embedded in place of at least a part of zero-run section immediately preceding an EOB (End of Block), which is obtained by dividing image data, orthogonal transforming the divided blocks of image data and quantizing the orthogonal transformed blocks of image data, comprising:

an unbedder for unbedding the supplemental information from the image compression data;

a memory for storing the unbedded supplemental information; a replacer for replacing the supplemental information embedded in the image compression data with a zero-run;

a reverse quantizer for reverse quantizing the zero-replaced image compression data; and a reverse orthogonal transformer for reverse orthogonal transforming the reverse quantized image compression data.

12. An image decoder for decoding reversible compressed image data wherein supplemental information is embedded in place of at least a part of a zero-run section immediately preceding an EOB (End of Block) obtained by dividing image data, orthogonal transforming the divided blocks of image data and quantizing the orthogonal transformed blocks of image data, comprising:

a reversible decoder for reversible decoding the image compression data;

an unbedder for unbedding the supplemental information from the reversible decoded image compression data;

a memory for storing the unbedded supplemental information;

a replacer for replacing the supplemental information embedded in the image compression data with a zero-run;

a reverse quantizer for reverse quantizing the zero-replaced image compression data; and a reverse orthogonal transformer for reverse orthogonal transforming the reverse quantized image compression data.

13. An image encoding method comprising:

orthogonal transforming divided blocks of image data;

quantizing the divided blocks of image data after the orthogonal transforming operation; and embedding supplemental information into at least a part of a zero-run section immediately preceding an EOB (End of Block) in each of the quantized blocks.

14. An image encoding method comprising:

orthogonal transforming divided blocks of image data;

quantizing the divided blocks of image data after the orthogonal transforming operation; and embedding supplemental information in place of the head of a zero-run section immediately preceding an EOB (End of Block) in each of the quantized block.

15. An image encoding method comprising:

orthogonal transforming divided blocks of image data;

quantizing the divided blocks of image data after the orthogonal transforming operation;

dividing supplemental information corresponding to one frame of image data into a plurality of blocks; and dispersively embedding the divided blocks of supplemental information into the image data in place of the head of a zero-run section immediately preceding an EOB (End of Blocks) of the quantized blocks of image data.

16. A method for decoding image data wherein supplemental information is embedded in place of at least a part of a zero-run section immediately preceding an EOB (End of Block), which is obtained by dividing image data, orthogonal transforming the divided blocks of image data and quantizing the orthogonal transformed blocks of image data, comprising:

unbedding the supplemental information from the image compression data;

storing the unbedded supplemental information;

replacing the supplemental information embedded in the image compression data with a zero-run;

reverse quantizing the zero-replaced image compression data; and reverse orthogonal transforming the reverse quantized image compression data.

17. A method for decoding reversibly compressed image data wherein supplemental information is embedded in place of at least a part of the zero run section of immediately preceding an EOB (End of Block), which is obtained by dividing image data, orthogonal transforming the divided blocks of image data and quantizing the orthogonal transformed blocks of image data, comprising:

reversible decoding the image compression data;

unbedding the supplemental information from the reversible decoded image compression data;

storing the unbedded supplemental information;

replacing the supplemental information embedded in the image compression data with a zero-run;

reverse quantizing the zero-replaced image compression data; and reverse orthogonal transforming the reverse quantized image compression data.

18. A supplemental information embedding apparatus, comprising:

means for capturing a first image data;

first storing means for storing a second image data indicating the presence of copyright protection;

first encoding means for encoding the first image data obtained by the image capturing means to a first format digital image data by n stages of processing (n is a positive integer greater than or equal to 2);

second storing means for storing the first format digital image data produced in the first encoding means;

second encoding means for encoding the image data indicating a copyright data supplied from the image capturing means or the first storing means to a second format digital watermark by i stages of processing (i is a positive integer less than n);

third storing means for storing the encoded second format digital watermark encoded by the second encoding means;

means for decoding the first format digital image data stored in the second storing means up to a prescribed stage of decoding;

means for dividing the second format digital watermark stored in the third storing means into predetermined format blocks;

means for dispersively embedding the blocks of the digital watermark into the image data encoded up to i stage by the first encoding means or the image data decoded up to i stage by the decoding means;

third encoding means for encoding the image data obtained by the digital watermark embedding means by exerting operations on or after j stage (j=n−1) of encoding so as to produce the first format digital image data; and means for storing the first format digital image data encoded by the third encoding means.

19. A supplemental information embedding apparatus, comprising:
   means for orthogonal transforming divided blocks of image data;
   means for quantizing the divided blocks of image data after the orthogonal transforming operation; and
   means for embedding supplemental information in place of at least a part of a zero-run section immediately preceding an EOB (End of Block) in each of the quantized blocks of image data.

20. A supplemental information embedding apparatus, comprising:
   means for orthogonal transforming divided blocks of image data;
   means for quantizing the divided blocks of image data after the orthogonal transforming operation; and
   means for embedding supplemental information in place of the head of a zero-run section immediately preceding an EOB (End of Block) in each of the quantized blocks of image data.

21. A supplemental information embedding apparatus, comprising:
   means for orthogonal transforming divided blocks of image data;
   means for quantizing the divided blocks of image data after the orthogonal transforming operation;
   means for dividing supplemental information corresponding to one frame of the image data into a plurality of blocks; and
   means for dispersively embedding the divided blocks of supplemental information into the image data in place of the head of a zero-run section immediately preceding an EOB (End of Blocks) of the quantized blocks of image data.

22. A supplemental information embedding apparatus as claimed in any one of claims 19 to 21, further comprising:
   means for reversible compressing the blocks of image data embedded with the supplemental information.

23. An image decoder for decoding image compression data wherein supplemental information is embedded in place of at least a part of zero-run section immediately preceding an EOB (End of Block), which is obtained by dividing image data, orthogonal transforming the divided blocks of image data and quantizing the orthogonal transformed blocks of image data, comprising:
   means for unbedding the supplemental information from the image compression data;
   means for storing the unbedded supplemental information;
   means for replacing the supplemental information embedded in the image compression data with a zero-run;
   means for reverse quantizing the zero replaced image compression data; and
   means for reverse orthogonal transforming the reverse quantized image compression data.

24. An image decoder for decoding reversible compressed image data wherein supplemental information is embedded in place of at least a part of a zero-run section immediately preceding an EOB (End of Block) obtained by dividing image data, orthogonal transforming the divided blocks of image data and quantizing the orthogonal transformed blocks of image data, comprising:
   means for reversible decoding the image compression data;
   means for unbedding the supplemental information from the reversible decoded image compression data;
   means for storing the unbedded supplemental information;
   means for replacing the supplemental information embedded in the image compression data with a zero-run;
   means for reverse quantizing the zero replaced image compression data; and
   means for reverse orthogonal transforming the reverse quantized image compression data.

* * * * *